Aug. 2, 1932.  W. F. BOWMAN  1,869,405
ROCKER BEARING FOR WALKING BEAM END CONNECTIONS
Filed April 16, 1930
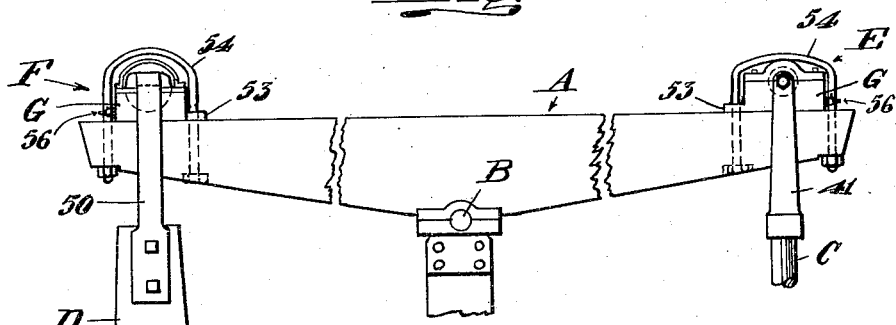
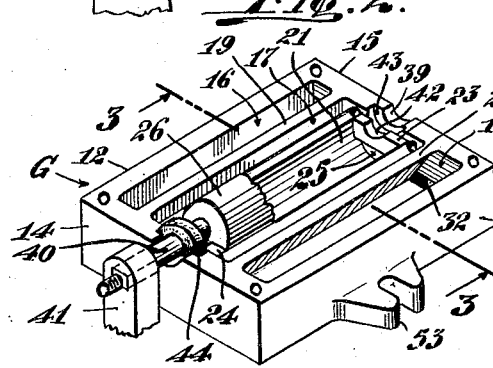
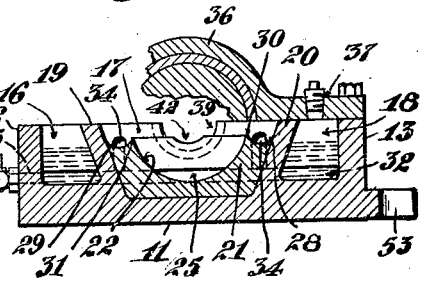
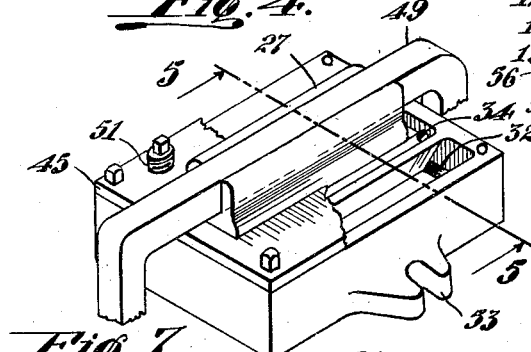
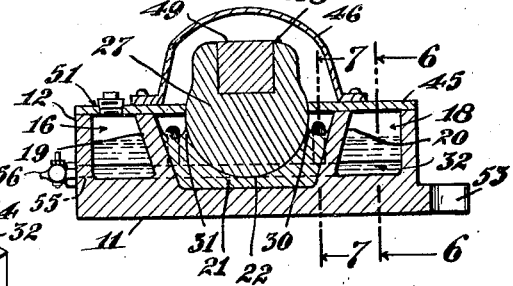
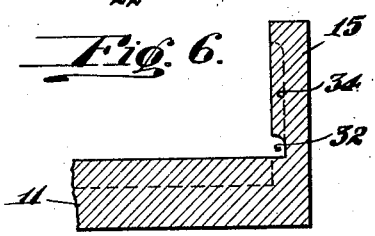
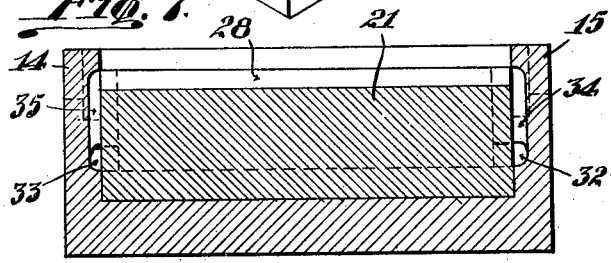
Inventor:
William F. Bowman
By R. S. Berry
Atty.

Patented Aug. 2, 1932

1,869,405

UNITED STATES PATENT OFFICE

WILLIAM F. BOWMAN, OF OCEAN PARK, CALIFORNIA

ROCKER BEARING FOR WALKING BEAM END-CONNECTIONS

Application filed April 16, 1930. Serial No. 444,695.

This invention relates to bearing for walking beams and more particularly pertains to the bearing connections at the outer ends of walking beams employed in operating oil well pumps in which a pump rod is connected to one end of the walking beam and a pitman is connected to the other end thereof.

An object of the invention is to provide a bearing of the above character which is so formed as to afford effective lubrication of the wearing surfaces of the bearing by the provision of a reservoir for a lubricant with ducts leading therefrom to the journal of the bearing whereby frequent applications of lubricant is avoided.

Another object is to provide a rocker bearing embodying a lubricant reservoir in which the latter is so arranged as to be protected from the weather and the lubricant so confined as to minimize fire hazard.

Another object is to provide a bearing box for walking beam end connections which is so designed that it may be employed either as a bearing for the pump rod connection or the pitman connection.

Another object is to provide a rocker bearing for walking beam end connections which is adapted to be so mounted on a walking beam as to be self-aligning.

With the foregoing objects in view, together with such other objects and advantages as may subsequently appear, the invention resides in the parts and in the combination, construction and arrangement of parts hereinafter described and claimed and illustrated by way of example in the accompanying drawing, in which:

Fig. 1 is a view of a walking beam as seen in side elevation with the rocker bearings embodying the invention as carried thereon with the end connections applied;

Fig. 2 is a detail in perspective, with parts removed, of the bearing box showing it as applied with the pump rod connection;

Fig. 3 is a view in cross section taken on the line 3—3, with parts broken away;

Fig. 4 is a view in perspective, with parts broken away, showing the bearing box as applied to the pitman end connection;

Fig. 5 is a view in cross section taken on the line 5—5 of Fig. 4;

Fig. 6 is a detail in vertical section as seen on the line 6—6 of Fig. 5; and

Fig. 7 is a view in longitudinal section taken on the line 7—7 of Fig. 5.

Referring to the drawing more specifically, A indicates a walking beam pivoted intermediate its ends at B in the usual manner, C and D indicate respectively a pump rod and a pitman, and E and F indicate generally the end connections between the walking beam and the pump rod and pitman. Each of the end connections embodies a bearing box G which is rectangular in outline and embodies a bottom wall 11, side walls 12 and 13 and end walls 14 and 15; the bottom wall 11 being designed to loosely seat on the flat upper face of the walking beam.

The interior of the box is divided longitudinally into three compartments 16, 17 and 18 by partitions 19 and 20, the upper margins of which partitions terminate on a plane with the upper margins of the end walls 14 and 15 which extend on a plane with the upper edges of the side walls 12 and 13. The adjacent faces of the partitions 19 and 20 are inclined outwardly with relation to each other and the bottom of the compartment 17, between the partitions, is extended to a plane below the bottom surfaces of the compartments 16 and 18.

Mounted in the intermediate compartment 17 is a removable and renewable bushing 21 formed of Babbitt metal, bronze or other suitable relatively soft metal and which bushing is formed with a longitudinal recess 22 of arcuate cross-section, there being end walls 23 and 24 formed on the bushing, and formed in said end walls at each end of the bushing are openings 25, the lower margins of which are formed in continuation of the lower arcuate portion of the recess 22.

The bushing 21 affords a seat for a rocker 26 or 27; the rocker 26 being cylindrical as shown in Figs. 2 and 3 and the rocker 27 being partly cylindrical as shown in Figs. 4 and 5. In either event, the lower portion of the rocker and the arcuate bottom wall of the recess 22 are in conformity to afford a bearing surface between the rocker and the bushing of substantial area, and the upper margin of the recess 22 is located on a plane below the axis of the rocker.

Formed on the upper face of the bushing, at opposite sides of the recess 22, are grooves 28 and 29, between which and the longitudinal margins of the recess 22, are formed lips 30 and 31 which constitute wipers and are designed, on oscillation of the rockers, to scrape excessive lubricant therefrom and cause such lubricant to flow into the channels 28 and 29.

The compartments 16 and 18 constitute lubricant reservoirs in which a suitable lubricating oil is placed and as a means for effecting delivery of the lubricant from the reservoirs to the bearing surface between the rocker and the bushing, the inner faces of the end walls 14 and 15 of the bearing box are formed with transverse channels 32 and 33 which constitute ducts affording communication between both ends of the lubricating chambers and also affording communications between the reservoirs and the openings 24 and 25 in the bushing end walls. The inner faces of the end walls of the bearing box are also formed with vertical grooves 34 and 35 which lead upwardly from the transverse ducts 32 and open opposite the ends of the channels 28 and 29 and serve as a means for directing lubricant from said channels into said ducts.

Where the bearing box G is employed to receive a cylindrical rocker 26, as where used in the connection for the pump rod C, a cover 36 is provided for the bearing box which is formed to extend over the compartments 16, 17 and 18 and to overlie the cylindrical rocker so as to occlude water and dirt from the lubricant reservoirs and the bearing surface. The cover 36 is provided with a filler opening 37 through which lubricant may be introduced into one of the lubricant chambers as occasion may require without necessitating removal of the cover. The bearing box in this instance is formed at its end walls 14 and 15 with recesses 39 through which trunnions 40 on the rocker 26 project beyond the ends of the bearing box; the trunnions being spaced from the surfaces of the recesses 39 so that the rocker 26 will bear entirely on the bushing 21. The outer ends of the trunnions 40 connect with a yoke 41 to which the pump rod C is attached. The upper margins of the end walls of the bushing are also formed with recesses 42 to accommodate the trunnions, and formed on the inner faces of the end walls of the bearing box are recesses 43 to accommodate padded gaskets 44 encircling the trunnions 40 and which will thus be interposed between the end walls 14 and 15 of the bearing box and the ends of the bushing.

Where the bearing box is employed to receive the rocker 27 used in the pitman connection F to the walking beam A, a cover 45 is provided which extends over the compartments 16, 17 and 18 and has a central opening through which the upper portion of the rocker 27 projects; the margins of the opening abutting against the sides and ends of the rocker as shown in Figs. 4 and 5. In this arrangement the upper portion of the rocker 27 projects above the cover 45 and as a means for excluding rain and dust an additional cover 46 is provided which extends over the rocker and is detachably carried on the cover 45. In this instance the rocker 27 is provided with a longitudinal channel 48 formed on the upper side thereof which channel is of rectangular cross section and has mounted therein a bar 49 constituting the upper portion of a yoke 50 attached to the upper end of the pitman D; the bar 49 being welded or otherwise secured in place on the rocker.

The cover 45 is provided with a filler opening 51 leading to one of the lubricant receptacles.

As a means for holding the bearing box in place on the walking beam and yet permit slight shifting thereof a bifurcated lug 53 is formed on the inner side wall of the bearing box adjacent the lower edge thereof which lug is engaged by one of the legs of a U-bolt 54, constituting a stirrup which is secured to the end portions of the walking beam and is positioned astride the bearing box intermediate the ends thereof with its connecting portion extending over the bearing box in spaced but proximate relation thereto.

In the operation of the invention, rocking of the walking beam A will cause the rockers 26 and 27 to rock laterally in their bearings on the bushings and lubricating oil will be directed from the compartments 16 and 18 through the channels 32 to the lower portion of the bearing recess 22 and will be caused to advance between the rocker and bushing longitudinally thereof by gravity flow and the lubricant thus delivered between the rocker and the bushing will be distributed over the bearing surface by the rocking movement of the rocker. A portion of the lubricant adhering to the rocker will be carried above the upper margin of the bushing on upward movement of the rocker and on downward movement thereof will be wiped off by the lips 30 and 31 into the channels 28 and 29 from which this excess lubricant will be directed back into the feed channels 24 and 25 through the vertical channels 34 and 35.

In this manner effective lubrication of the contacting surfaces of the rocker and the bushing will be effected and accordingly friction and consequent wear will be reduced to a minimum.

By mounting the bearing box for slight sliding movement on the walking beam it will readily adapt itself to any slight disalignment of the walking beam relatively to the pump rod and pitman.

As a means for facilitating removal of the lubricant from the compartments 16 and 18 when it is desired to effect renewal thereof, a drain outlet 55 is provided to lead from the compartment 16 and is fitted with a normally closed pet-cock 56 on opening of which the lubricant will readily drain from the compartments when the walking beam is positioned to direct the outlet 55 downwardly.

I claim:

1. The combination with a walking beam, of a bearing box seated on said walking beam for slidable movement relatively thereto, a bifurcated lug projecting from one side of said bearing box, and a U-shaped stirrup connected at its end to said walking beam and extending astride of said bearing box and loosely engaged by said lug.

2. The combination with a walking beam, of a bearing box seated on the upper face of said walking beam having a lug projecting from one side thereof, a rocker journalled in said bearing box extending transversely of said walking beam, a dependent yoke connected to said rocker extending astride said walking beam, and a stirrup extending astride said bearing box and rocker; said stirrup being affixed to said walking beam and being engaged by said lug.

3. A bearing for end connections of walking beams comprising a box formed with a bottom wall, side walls and end walls, a pair of partitions in said box having oppositely inclined surfaces, a removable bushing having inclined walls seating on said partitions, a rocker bearing on said bushing, and ducts in the end walls of said box affording a communication between the lower portion of the ends of said rocker and spaces between said partitions and side walls of the box.

4. A bearing for end connections of walking beams, comprising a box, a bushing seated in said box, a rocker seated in said bushing, a compartment in said box extending longitudinally of said bushing for the reception of lubricant, a transverse duct leading from each end of said compartment extending along and opening to the ends of said bushing at the lower meeting faces of the bushing and rocker, said bushing being formed with longitudinal channels on its upper side margins to receive lubricant wiped from said rocker, and grooves leading from the ends of said channels downwardly to said ducts.

WILLIAM F. BOWMAN.